United States Patent [19]

Thompson

[11] 4,384,791

[45] May 24, 1983

[54] ROTATING DRUM CALORIMETER

[75] Inventor: Charles C. Thompson, Jupiter, Fla.

[73] Assignee: United Technologies Corporation, Hartford, Conn.

[21] Appl. No.: 298,980

[22] Filed: Sep. 3, 1981

[51] Int. Cl.³ .............................................. G01K 17/00
[52] U.S. Cl. ..................................................... 374/32
[58] Field of Search ..................... 374/29, 32; 250/352

[56] References Cited

U.S. PATENT DOCUMENTS 4,037,470  7/1971  Mock et al. ............................ 374/32
4,301,680  11/1981  Lunev et al. ......................... 374/32

Primary Examiner—Herbert Goldstein
Attorney, Agent, or Firm—Eric W. Petraske

[57] ABSTRACT

A calorimeter for measuring the energy in a particle beam employs a right circular cylinder rotating about its axis through which a coolant passes along an axial pipe through the skin of the cylinder and then out the axial pipe.

3 Claims, 3 Drawing Figures

ROTATING DRUM CALORIMETER

DESCRIPTION

TECHNICAL FIELD

The field of the invention is the measurement of energy in an optical or particle beam.

BACKGROUND ART

Calorimeters have been used to measure the energy in a beam, usually by means of heating a working fluid and measuring the temperature rise within the fluid. One such prior art calorimeter is illustrated in an article by S. Lovell and Shun Shen, in Physics in Medicine and Biology, Vol. 21, No. 2, 1976 starting on page 198. This article illustrates a cylindrical calorimeter in which the beam to be measured enters along the axis of the cylinder and is absorbed by a working fluid therein. The fluid also flows from one end of the cylinder to another, flowing through a baffle maze. A second calorimeter is illustrated in Russian Pat. No. 270,299, in which the beam being measured enters along the axis of a circularly symmetric maze calorimeter. The symmetry of this calorimeter is that of surfaces rotated about an axis, but the calorimeter itself does not rotate.

DISCLOSURE OF INVENTION

The invention relates to a calorimeter in which coolant fluid flows along a pipe positioned on the axis of a right circular cylinder, flows outward through the top of the cylinder, flows along the skin of the cylinder then back into the axis along the bottom surface, then flows outward again along the axis. The cylinder rotates about that axis thereby distributing the heat load over the entire surface.

BRIEF DESCRIPTION OF DRAWING

FIG. 1a illustrates a detail of the outer surface of the calorimeter in FIG. 1.

BEST MODE FOR CARRYING OUT THE INVENTION

Figure 1:
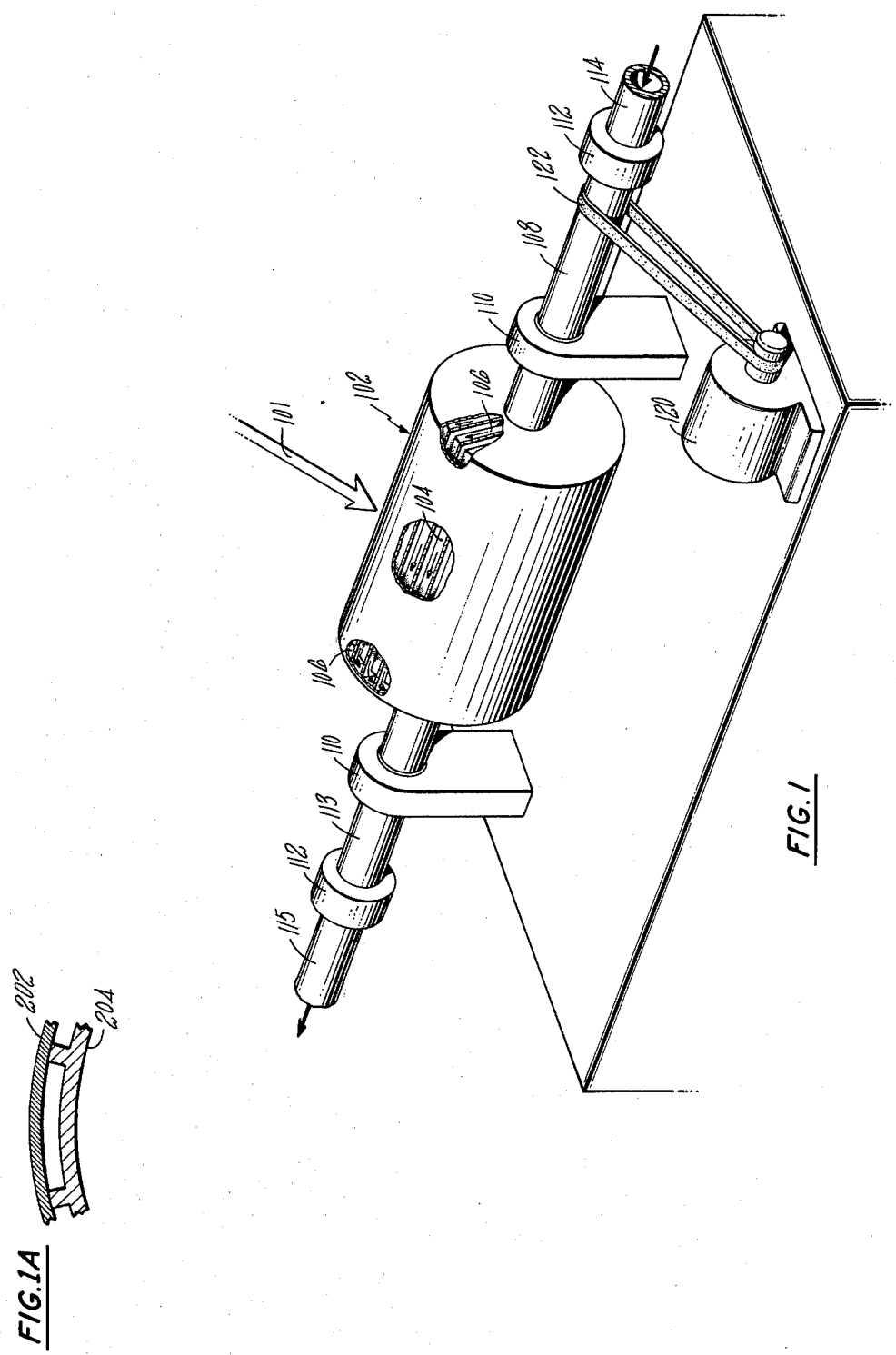
FIG. 1 illustrates an embodiment of the invention.

In FIG. 1, optical beam 101 impinges on a calorimeter which is to absorb the energy contained within that beam and provide a measurement of that energy. In order to form the measurement, cooling water enters shaft 114 at a known temperature, passes through the body of the calorimeter which is in the form of a right circular cylinder 102, and exits pipe 115 in which the temperature of the water is again measured. The combination of the measured temperatures with the known flow rate of the water provides a measure of the energy absorbed and therefore of the energy deposited by the beam.

An advantageous feature of the present invention is that the absorbing surface of the calorimeter is rotated at a high rate of speed, thereby distributing across the entire surface of the calorimeter the heat load to be absorbed and also effectively increasing the pressure of the water, thereby increasing both the boiling point of the water and the heat flux which the water can absorb.

Input water enters through pipe 114, which is connected to pipe 108 by rotating seal 112. Pipe 108 rotates with the body of the calorimeter 102 and is supported by bearings 110. Cooling water flows radially outward through the face channels 106 in the right-hand face of cylinder 102, then flows along the surface of cylinder 102 through channels 104 matched to the radial channels 106, then downwards toward the axis again through channels 106 matched to the channels for the inlet water. The water then exits, at an elevated temperature, through exit pipe 113 supported by bearing 110 and connected to stationary pipe 115 by rotating the seal 112. A detail of coolant channels 104 contained within the skin of cylinder 102 is illustrated in FIG. 1a, in which passages 104 are machined in surface 204 and outer surface 202 is brazed to the lands between passages 104. Cylinder 102 and its attached shafts 108 and 113 are turned illustratively by belt 122 powered by motor 120. Any other well known means of turning the cylinder may be used of course.

Since absorbing surface 202 is rotating at a high rate of speed through the beam, high intensity spikes within the beam are averaged out over the surface, thus making it possible for the calorimeter to tolerate extremely high fluxes at a small point, fluxes that would burn out a stationary calorimeter. Also, the high rate of revolution increases the pressure of the coolant at the outside surface of the drum through centrifugal force. This increased pressure raises the saturation temperature of the water and thus suppresses the onset of boiling. The centrifugal forces also enhance the boiling heat transfer by artificially creating buoyancy forces that promote bubble transport away from the heated surface, as the bubbles seek to travel to the center of the cylinder. Further, high system operating pressures are created by the rotation so that the water supply pressure may be quite low in comparison to the water supply pressure required by previous calorimeter designs. The result of these advantageous features of the invention has been that the heat flux capability of the calorimeter is extremely high, as much as ten times greater than calorimeters in the prior art, thus making it possible to decrease significantly the size of the calorimeter. This smaller size also makes it possible for the calorimeter to respond more quickly to changes in the beam power level than is possible with the prior art calorimeters which have a very large thermal mass and thus a long response time. In contrast to prior art calorimeters, which employ highly reflective surfaces to spread the heat load through a multiplicity of reflections, a calorimeter constructed according to the principles of this invention does not employ a highly reflective surface, and thus does not have the maintenance problems associated with them. The calorimeter may be employed with optical beams, as have previous calorimeters, and also with particle beams.

In operation, water passes through rotating shaft 108 into the radial channels 106 at a relatively low pressure compared to calorimeters in the prior art; then travels outward, aided by the centrifugal forces, to the outer skin. These centrifugal forces increase the pressure as has been described above. The water passes along the surface of the calorimeter absorbing energy from the beam as it goes and then travels radially inward along surfaces 106 in the other end plate. The two symmetric sets of radial grooves 106 cancel out the centrifugal "pumping" effect and the water exits rotating shaft 113 at a low pressure, illustratively 15 lbs.

Figure 2:
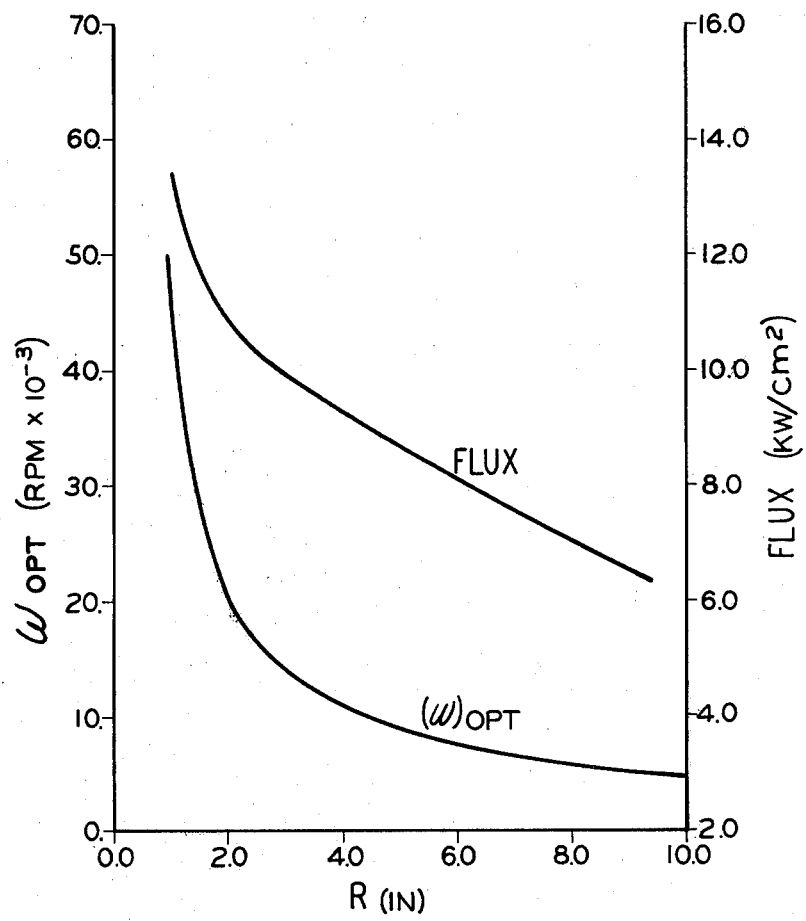
FIG. 2 illustrates a graph showing various parameters of the invention.

Design of a calorimeter according to the principles of the invention involves a trade-off between calorimeter size and operating rate of revolution. The increase in pressure at the outer surface is a monotonic function of the revolutions per minute squared, but the flux in kilowatts per square centimeter which can be tolerated is not montonic as a function of increased water pressure, passing through a broad peak then declining. For any radius, the amount of heat flux that can be tolerated before the calorimeter is damaged, referred to as the burnout heat flux, increases sharply as the rotation speed increases, then declines gradually. The shape of this curve is a function of the calorimeter radius, being an essentially monotonic function of rotational speed over a reasonable operating range for a small radius and having a sharp peak for a radius of about 8 inches. It is possible to calculate the optimal value of rotational speed in revolutions per minute for each radius, and to combine values of this optimal speed to form a curve correlating radius of the calorimeter with the optimal speed of rotation and the maximum heat flux associated with that optimal speed of rotation. FIG. 2 illustrates such a curve, in which the abscissa is the radius of the calorimeter in inches, the left-hand ordinate is the optimal rotational speed for maximum tolerable heat flux and the right-hand ordinate is the maximum value of the heat flux for that radius and that rotational speed. For example, for a calorimeter of radius 8 inches, the optimal speed of rotation is 5,500 revolutions per minute and the maximum tolerable heat flux at that speed for that radius is 7 kilowatts per square centimeter.

An illustrative embodiment of the invention includes a drum calorimeter having a radius of 8 inches, a length of 12 inches and thus an absorbing area of 603 square inches. This calorimeter has a water flow of 500 gallons per minute with an inlet pressure of 250 lbs., an outlet pressure of 15 lbs. and a maximum pressure at the surface caused by the centrifugal pumping effect of 1,250 lbs. per square inch. The amount of flux in the beam that can be tolerated on the absorbing surface ranges from 350 kilowatts per square centimeter for a 1 inch diameter beam spot to 35 kilowatts per square centimeter uniformly distributed over a 10 inch diameter beam spot.

The material of outer surface 202 may be a high thermal heat conductor, such as copper, brazed to surface 204, formed of any convenient material, since the thermal conductivity of surface 204 is not important. The shape of channels 106 and 104 is also not important.

The calorimeter may be used with circular beams having a diameter up to the diameter of the cylinder, but is not limited to beams having a circular cross section and will work well with line-focus beams. The calorimeter rotation axis can be skewed relative to the direction of propagation of an incoming beam, thereby increasing the calorimeter surface area over which energy is absorbed and further increasing the amount of beam energy flux that may be tolerated.

I claim:

1. A calorimeter comprising coolant inlet and exit passages disposed along a rotation axis;
    a rotating absorbing surface having a first and second end and being disposed about said rotation axis for absorbing energy impinging thereon, said absorbing surface being in thermal contact with a plurality of coolant passages extending from said first to said second end;
    first and second coolant transfer members for passing coolant between said coolant passages and said coolant inlet and exit passages, whereby coolant flows through said inlet passage substantially along said axis, outward through said first coolant transfer member to first ends of said plurality of coolant passages, through said plurality of coolant passages from said first ends to second ends, inward through said second coolant transfer member to said exit passage and through said exit passage, substantially along said rotation axis; and
    first and second rotating seals attached to said coolant inlet and exit passages.

2. A calorimeter according to claim 1, in which said first and second coolant transfer members combine with said absorbing surface to form a right circular cylinder and in which each of said coolant passages joins to first and second radial coolant passages formed in said first and second coolant transfer members, respectively, for transporting coolant from and to said inlet and exit passages.

3. A calorimeter according to either of claims 1 or 2, in which rotation means rotate said absorbing surface about said rotation axis at a predetermined rotational frequency, whereby said impinging energy is distributed azimuthally over a portion of said absorbing surface.

* * * * *